Sept. 16, 1947. M. D. BERGAN 2,427,518
ELECTRICAL CONNECTING CONDUCTOR
Filed March 28, 1945
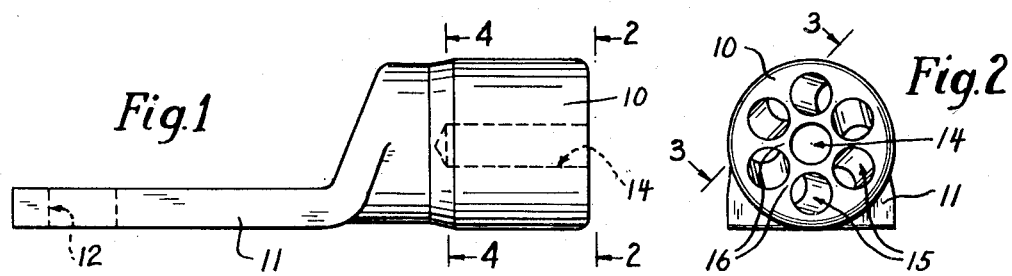
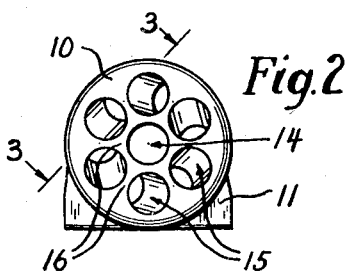
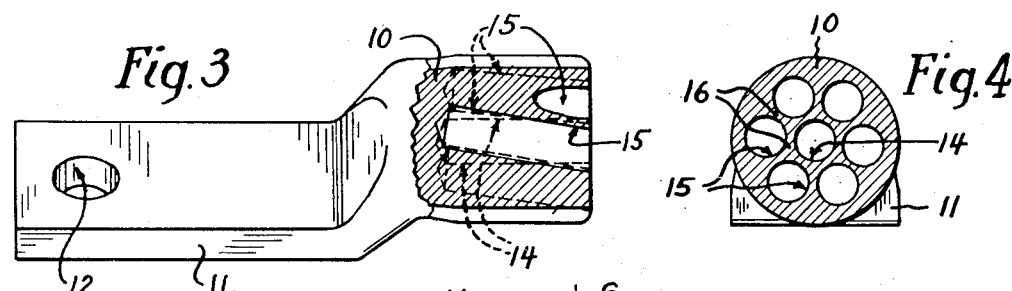
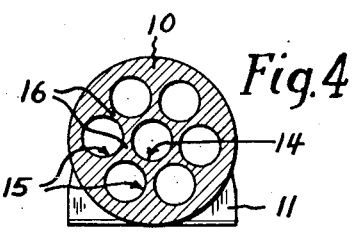
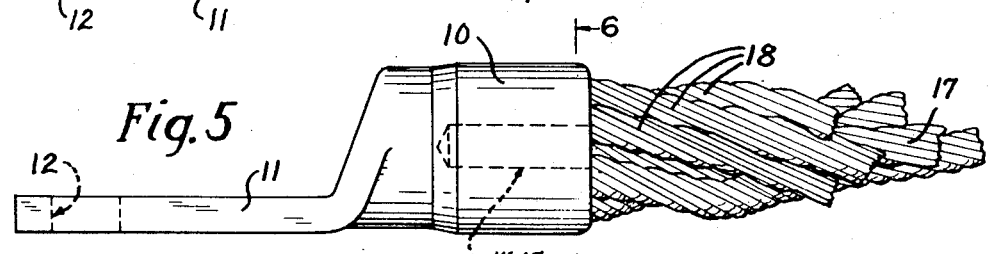
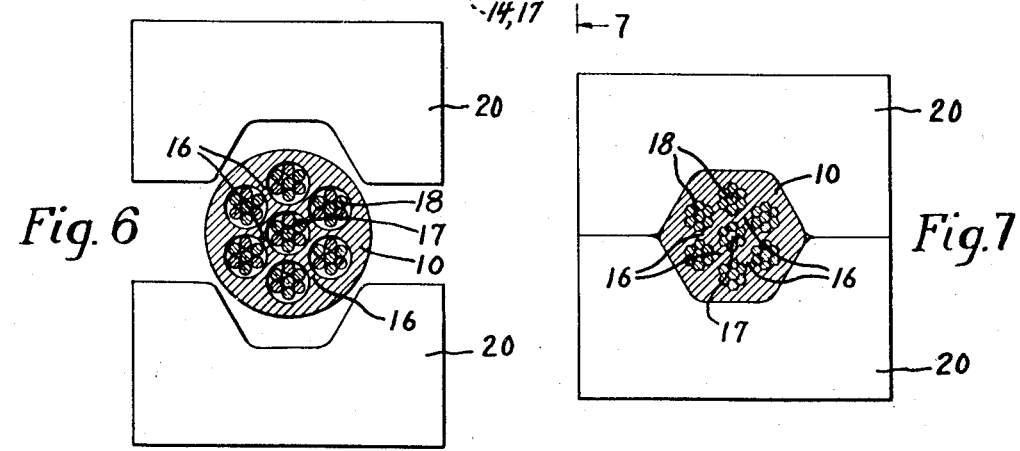
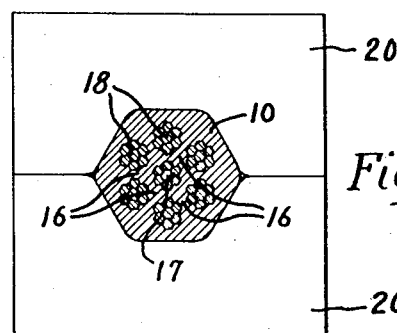
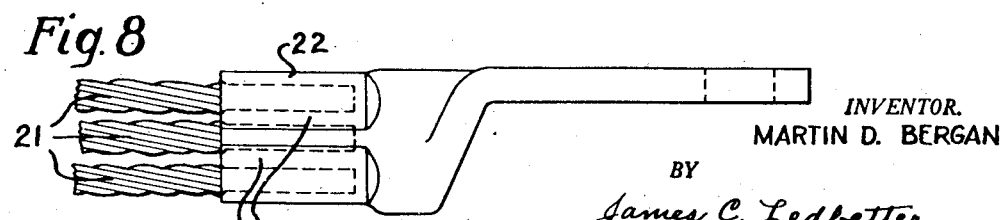
INVENTOR.
MARTIN D. BERGAN
BY
James C. Ledbetter
ATTORNEY Patented Sept. 16, 1947

2,427,518

UNITED STATES PATENT OFFICE 2,427,518

ELECTRICAL CONNECTING CONDUCTOR

Martin D. Bergan, Westfield, N. J., assignor to The Thomas & Betts Co., Elizabeth, N. J., a corporation of New Jersey Application March 28, 1945, Serial No. 585,245

1 Claim. (Cl. 173—269)

This invention relates to solderless electrical connectors embodying a homogeneous joint between a connector and a stranded cable by which to produce a low resistance electrical connection of rugged form and high mechanical pull-out value.

A purpose of the invention is to produce an Electrical Connecting Conductor, embodying a connector member which may be used with and compressively bonded onto an electrical cable, especially of the stranded type, as for example, stranded straight-lay cable and stranded rope-lay cable and which, by the new method herein, may be satisfactorily joined thereto by compression dies in such manner that the normal lay or natural position of the cable strands remains unaltered and free from kinking strain and rupture when the connector is installed on the cable and throughout the life of the bonded solderless joint.

Furthermore, an important purpose is to produce an electrical connector of such characteristics that the individual wires and the cable strand composed thereof are enveloped in a separate wall of ductile metal which cold-flows by compression into the interstices of the plurality of wires constituting each strand of the cable, thereby greatly increasing the mechanical and electrical bond of the joint in various types of electrical connectors, such as terminals, splices, taps, and other connectors to which the principle of this invention is applicable and found advantageous over previous forms of solderless joints.

Difficulty is experienced with conventional practice in securing an effective solderless joint between each individual wire of a strand and the connector, which is a problem inherent in the lack of means to bond the individual wires with the connector. The features of this invention supply such a need and provide means for sealing in the separate wires and bonding them as a strand into a connector.

The construction disclosed herein shows exemplary types of cable, as above mentioned, and a lug type terminal, as one form of electrical connector, produced in accordance with this invention for such cables, by which to illustrate the advantages and utility of the new electrical connector and conductor assembly.

The accompanying drawings illustrate the invention, present it in a manner preferred at this time, explain the features thereof in order to portray the scope of the invention by which to more readily demonstrate other embodiments which may develop out of the teachings of this specification, and aid in understanding the problems sought to be solved.

The description and drawings herein explain the principle of the invention and present the best mode contemplated in applying such principle, so as to distinguish the invention from others; and there is particularly pointed out and claimed, the part, improvement or combination, which constitutes the invention or discovery, as understood by a comparison thereof with the prior art.

Figs. 1 thru 5 show the invention adapted to stranded rope-lay cable, while Fig. 8 shows stranded straight-lay cable, as examples of a variety of cable types to which the invention may be adapted.

Fig. 1 shows a side view of an electrical terminal, while Fig. 2 is an end view thereof looking from the line 2—2.

Fig. 3 shows a sectional view as developed along the line 3—3, while Fig. 4 shows a cross section on the line 4—4.

Fig. 5 shows the strands of a rope-lay cable placed in position within the several bores of the connector before making the bonded solderless joint by compression.

Fig. 6 shows an end view, that is, a cable end view, of the connector placed between two dies before compression.

Fig. 7 shows the dies under compression to produce a solderless joint of bonded homogeneous formation. The cable and connector in these two views, in effect, may be regarded as showing, diagrammatically, a cross section on the line 6—7, except that the connector and the cable show a reduction in size due to the compression.

Fig. 8 shows a side view of a completed conductor, after removing it from the compression dies, thus being reduced to its final size. It is seen that a triple straight-lay cable is joined with the connector member, in a manner similar to the previous views. Any number of cables or strands may be joined with the connector and individually embraced in separate metallic portions thereof to form the new joint in accordance with this invention.

Referring now more particularly to the drawings for a detailed description of the invention, the connector chosen for illustration comprises a terminal or lug connector usually made of copper. This connector includes a hub 10 in which a cable is secured, and an integral lug tongue or bar 11 having a hole 12 for installing the connector and its electrical cable in service position. The perforated tongue or bar 11 merely represents one example of means carried by the connector for securing it in assembled service relation with other electrical apparatus.

The ductile copper hub 10 is provided with a center bore 14 along the axis of the hub from its outer end toward the tongue 11, and a group of concentrically arranged outer bores 15 are also formed in the hub 10 around the center bore. The bores 14 and 15 may have solid or closed bottoms, while their outer ends are open. The outer series of bores 15 are shown formed at an angle to the end face or plane of the hub 10, that is, at an angle to the line 2—2. Thus while the cable receiving socket or bore 14 is disposed on the axis of the hub 10, the outer circle of bores 15 is directed at an angle to the end face of the hub 10 to conform with the angle of the lead, that is, the angle of the spiral strands of a rope-lay cable for which the illustrated connector is produced.

The outer series of angular bores 15 are spaced from each other and also from the center bore 14 sufficiently to leave an internal cylindrical wall of ductile metal 16 between all outer bores as well as between the latter and the center bore. This feature is important in connection with the particular type of joint attained in accordance with this invention, that is, the sealing in of separate wires, and the bonding of each individual strand composed of said separate wires, into the metal body of the connector 10, 11.

The well known type of rope-lay cable is shown in Fig. 5, and it consists of a central linear or straight core strand 17 and several outer spiral strands 18. End views of this and other types of cable may be regarded as being shown in Figs. 6 and 7. It will be noted that the pitch or lead angle of the outer bores 15 in the connector hub 10 conforms with the pitch or lead angle of the outer spiral strands 18 of the rope-lay cable. Each strand 17 and 18 is pocketed into the individual bores 14 and 15, respectively, of the hub 10.

In assembling the connector hub 10 with the rope-lay cable, the outer strands 18 are slightly separated from each other as well as from the center or core strand 17 and are all introduced, respectively, into the bores 14 and 15. In other words, the center cable strand 17 is disposed in the central bore 14, and the outer spiral strands 18 are inserted into the outer angular bores 15.

The terminal and cable thus assembled (Fig. 5) is next placed in or between compression dies 20 (Fig. 6), and the latter are closed to compress or swage the metal of the hub 10 and of the cable strands 17 and 18 together, under great pressure, into a homogeneous mass (Fig. 7). Thus the ductile metal of the internal walls 16, and of the wires forming a strand, cold-flow into an integrated homogeneous mass, and form a continuous electrical current path. The pressure of the dies (Fig. 7) makes a complete joint, as shown in side view Fig. 8.

When the dies 20 are closed (Fig. 7) the internal ductile walls 16 of the hub 10, which separate the plurality of bores 14 and 15, cold flow into the interstices (formed by the individual wires) of the cable strands 17, 18 and thus produce a cold-welded joint of homogeneous form by reason of the ductility of the cable wires and copper hub 10. The great pressure applied by the dies seals the separate wires and the individual strands into the connector, so that in effect the metal of the wires and connector integrate into one bonded mass. The innermost core wire of a strand is likewise sealed in the mass by virtue of bonding with contiguous wires constituting said strand.

In Fig. 8 there is shown a simple straight lay cable, that is, a plurality of individual cables 21 having their ends placed in a connector sleeve or hub 22 having an equal number of straight bores formed parallel. This arrangement likewise provides, as hereinbefore explained, an internal metallic wall 23 between and surrounding each cable end 21. When compressed by the dies 20, a bonded joint of low electrical resistance, and capable of enduring high mechanical stress, is produced, as explained and shown in connection with previous views of the drawings and the method therein shown.

It will be noted that, in each example of the invention discussed, the ends of the cable strands 17, 18 and 21 are separated by definite spacing where they enter the connector members 10 and 22. This characteristic of the new electrical conductor and connector provides for full length internal separating annular walls 16 of ductile metal to embrace individually each strand portion of the cable, that is, the entire length thereof which is introduced into the connector hub 10. Accordingly, the individual wires constituting a strand are sealed into the connector against corrosive effect for the life of the conductor, this being one of the important problems solved by the invention.

This invention is presented to fill the need for a useful electrical connecting conductor. Various modifications in construction, mode of operation, use and method, may and often do occur to others skilled in the art, especially so after acquaintance with an invention. Accordingly, this disclosure is exemplary of the principles and equivalents without being limited to the present showing of the invention.

What is claimed is:

An electrical connecting conductor comprising, in combination, a connector having a hub to which is fitted a rope-lay cable, a central bore in which is held the core strand of said rope-lay cable, a series of outer bores provided symmetrically in the hub around the central bore and in which outer bores are held the outer strands of said rope-lay cable, annular walls of ductile metal defining each separate bore, the rope-lay cable having all of its strands separated at their entry into the hub, with the strands placed individually in the bores, by which the annular walls maintain the strands in separately spaced relation, and the hub being compressed and the respective annular walls of ductile metal cold-flowed under pressure into the interstices of the individual strands.

MARTIN D. BERGAN.

REFERENCES CITED

The following references are of record in the file of this patent:

UNITED STATES PATENTS

| Number | Name | Date |
| --- | --- | --- |
| 2,064,831 | Hawksley | Dec. 22, 1936 |
| 650,861 | McTighe | June 5, 1900 |
| 1,759,567 | Dibner | May 20, 1930 |
| 614,839 | Cleveland | Nov. 29, 1898 |